United States Patent [19]
Bedo et al.

[11] 3,908,463
[45] Sept. 30, 1975

[54] SAMPLE TRANSFER VALVE
[75] Inventors: Alfred Bedo, Walton Hills; Edward Beck, Cleveland Heights, both of Ohio
[73] Assignee: Sno-Trik Company, Solon, Ohio
[22] Filed: Mar. 4, 1974
[21] Appl. No.: 447,859

[52] U.S. Cl. .......................... 73/422 GC; 251/187
[51] Int. Cl.[2] .......................................... G01N 1/10
[58] Field of Search ........ 73/422 GC; 251/157, 170, 251/187, 193, 203, 204

[56] References Cited
UNITED STATES PATENTS

| | | | |
|---|---|---|---|
| 270,986 | 1/1883 | Rochow | 251/187 |
| 382,674 | 5/1888 | Woodbury | 251/187 |
| 3,521,674 | 7/1970 | Dodson et al. | 73/422 GC |

*Primary Examiner*—S. Clement Swisher
*Attorney, Agent, or Firm*—Fay & Sharpe

[57] ABSTRACT

The specification and drawings disclose a valve assembly useful for transferring a fluid sample from one flow line to another. The specific structure disclosed comprises a slide valve member mounted between a pair of opposed body-forming members. Each of the body-forming members has a pair of flow passages which are in alignment with those in the other body member. The valve member includes through orifices located so that in a first position the aligned flow passages are connected in flow relationship. However, when the valve member is shifted to a second position, at least one of the orifices moves from alignment with one set of aligned passages into alignment with the other set. This causes a fluid sample to be trapped in the orifice and transferred to the other set of passages. To assure a fluid seal about the passages and orifices, resilient inserts are carried in each of the body sections. A wedge member is provided to apply an adjustable force to the body sections to vary the compressive sealing force on the inserts.

9 Claims, 6 Drawing Figures

SAMPLE TRANSFER VALVE

BACKGROUND OF THE INVENTION

The subject invention is directed toward the valve art and, more particularly, to a sample transfer valve.

The invention is especially suited for use in gas chromatography systems and will be described with particular reference thereto; however, as will become apparent, the invention is capable of broader application and could be used in a variety of different fluid systems.

In gas chromatography systems, various types of valves are used to transfer a sample of a gas flowing through a process line to a second line where it is directed to a gas chromatograph for analysis. The valves must be capable of transferring a sample of a relatively exact, predetermined size with a minimum of interruption in flow through the process line. Additionally, there should be absolutely no leakage between the process line and the gas chromatograph line.

BRIEF DESCRIPTION OF THE INVENTION

The subject invention has for its primary object the provision of a valve which satisfies the above criteria simply and reliably. Specifically, according to the invention, the valve preferably comprises a housing carrying first and second opposed, relatively movable body sections. The body sections each include at least a pair of spaced passages which are in alignment with those of the other body section so as to define a pair of passageways which extend through the first and second body sections in parallel flow relationship. A slide valve member is positioned between the first and second body sections and includes at least two orifices spaced apart a distance generally corresponding to the spacing between the passages. Means for reciprocating the slide valve are provided to permit the slide valve to be moved to bring the orifices into and out of alignment with the passages and cause at least one of the orifices to move from alignment with one flow passageway into alignment with the other flow passageway. Additionally, an adjustable wedge means is positioned between one of the body sections and the housing so that the force of engagement between the body sections and the slide valve can be varied. Preferably, the body sections each include a resilient insert about each pair of passages on opposite sides of the valve member. The inserts provide a fluid seal between the valve member and the body sections. By tightening the adjustable wedge means, wear of the insert can be taken up and a seal maintained throughout a very large number of cycles.

Preferably, according to a more limited aspect, each insert is sized to encompass both passages in the respective body section with which it is associated. Additionally, each insert includes through openings aligned with the passages. An annular metal ring is positioned in each of the through openings. The rings are sized so that when the insert is compressed only a small clearance is present between the ring and the body section and the slide valve member. This prevents the insert material from extruding into the passageway.

A somewhat more limited object of the invention contemplates the provision of a valve of the type described which is compact and easily serviced.

Another object is the provision of a valve of the type discussed wherein the wedge member is mounted for movement in a direction parallel to the direction of movement of the valve member.

A still further object of the invention is the provision of a valve of the general class described wherein the seals can be tightened without disturbing flow through the valve.

The above and other objects and advantages will become apparent from the following description when read in conjunction with the accompanying drawings wherein.

Figure 1:
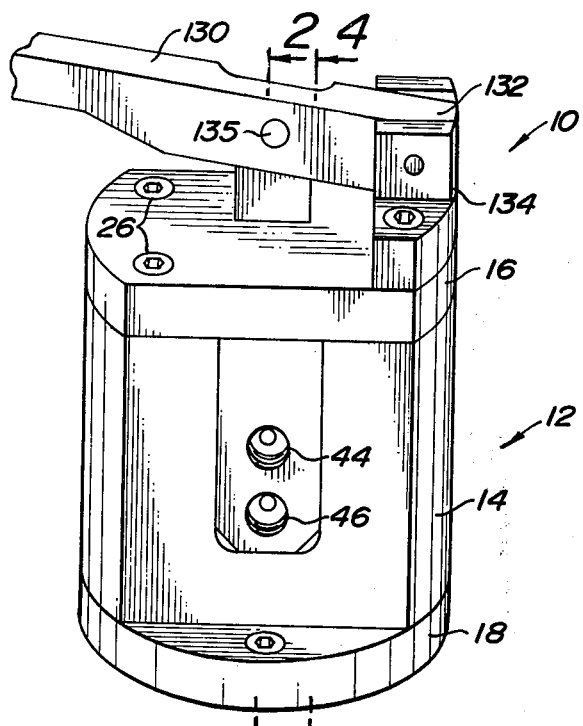
FIG. 1 is a pictorial view of a sample transfer valve formed in accordance with a preferred embodiment of the invention.
Figure 2:
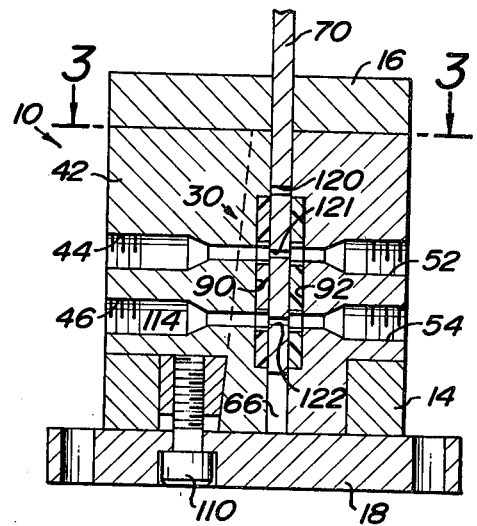
FIG. 2 is a vertical cross-sectional view taken on line 2—2 of FIG. 1.
Figure 4:
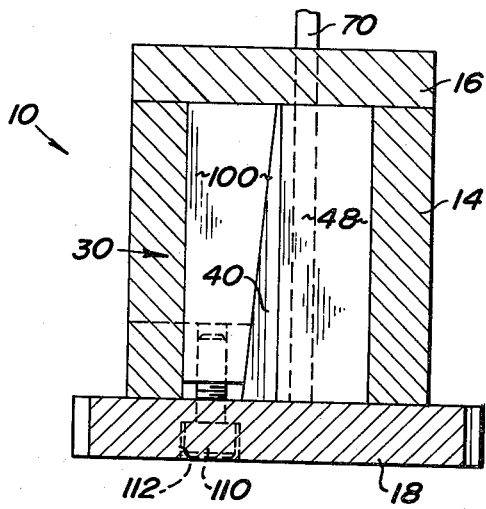
FIG. 4 is a cross-sectional view taken on line 4—4 of FIG. 1.

Referring more particularly to the drawings wherein the showings are for the purpose of illustrating the preferred embodiment of the invention only and not for the purpose of limiting same, FIGS. 1, 2 and 4 best show the overall arrangement of the valve 10 which includes an outer housing or body 12 comprising a central, generally cylindrical body section 14 and upper and lower end members 16 and 18, respectively.

Figure 3:
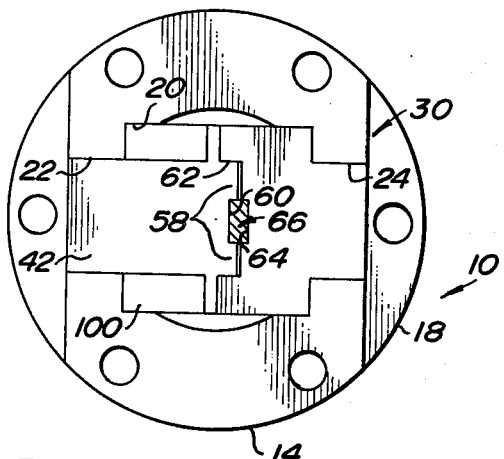
FIG. 3 is a cross-sectional view taken on line 3—3 of FIG. 2.
Figure 5:
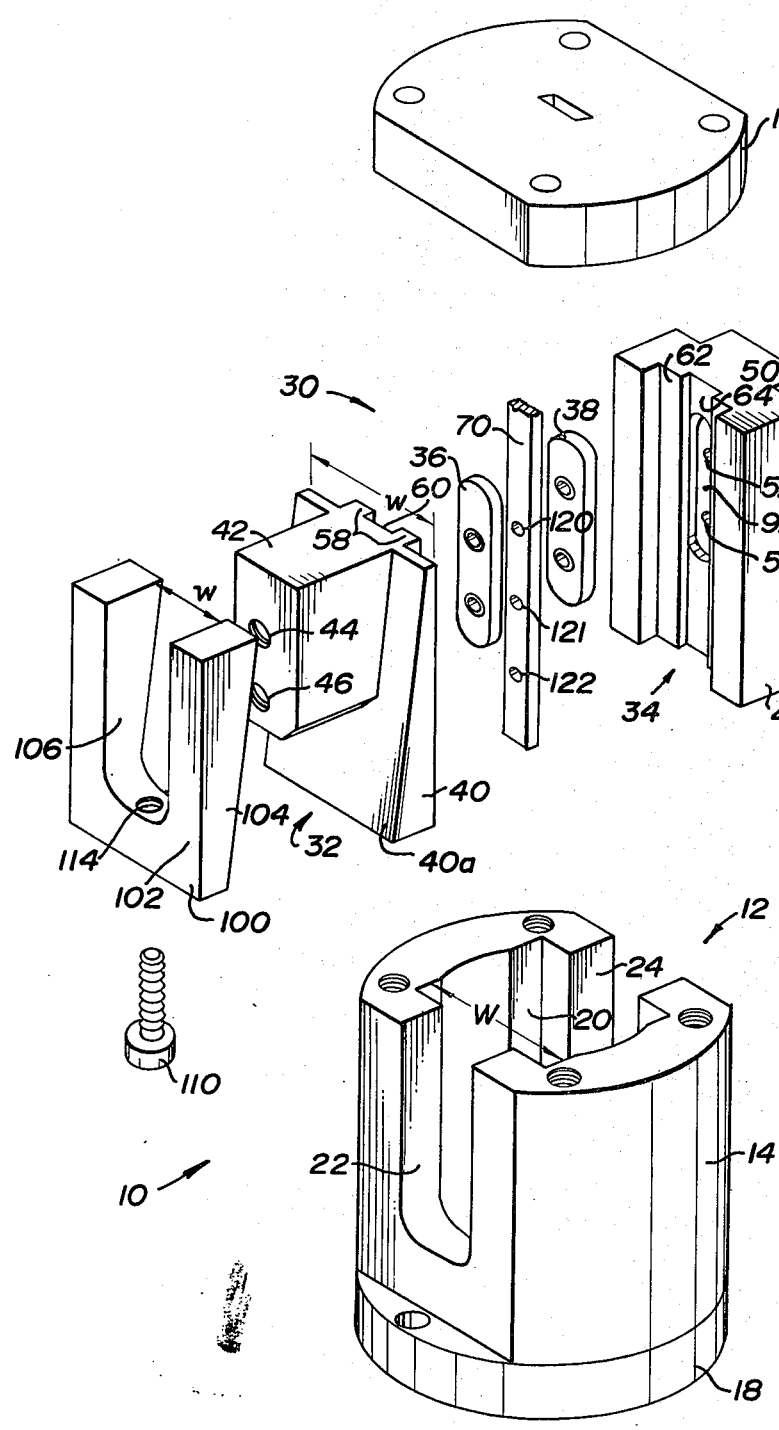
FIG. 5 is an exploded, pictorial view showing the major components of the valve of FIG. 1 and their relative relationship; and, FIG. 6 is an enlarged view of the valve element and packing or seat members of the valve of FIG. 1.

As best illustrated in FIGS. 3 and 5, the central body section 14 has a somewhat cylindrical shape and includes a generally rectangular center opening 20 which extends the length of the body and has oppositely disposed, generally U-shaped openings 22 and 24. The lower end of the body is closed by the end member 18 which is preferably releasably connected to the central body section 14 in any convenient manner such as through the use of machine screws (not shown). The upper end of the rectangular opening 20 is similarly closed by the upper end plate 16 which is releasably connected to the central body section 14 through the use of a plurality of machine screws 26.

Positioned within the rectangular opening 20 is the valve and wedge assembly 30. In general, the assembly 30 comprises a pair of cooperating, mating elements 32 and 34 which receive the seal elements 36 and 38, respectively. More specifically, the element 32 comprises a generally wedge-shaped body section 40 having a width w which is only slightly less than the width W of the opening 20. Extending to the left (as viewed in FIG. 5) from the body section 40 is a generally rectangular section 42. A pair of openings or ports 44 and 46 extend through portion 42 and the body 40. Preferably, ports 44 and 46 are threaded, as shown in FIG. 2, so that the process lines or the like can be releasably connected to the valve.

The section 34 is somewhat similar to section 32 and comprises a main body portion 48 and a generally rectangular, laterally extending portion 50. A pair of openings or ports 52 and 54 extend through section 48 and 50 in alignment with ports 44 and 46 of section 32.

As best seen in FIGS. 2 and 5, the body section 40 of element 32 includes a pair of laterally extending flanges 58 which define a vertically extending groove 60.

Flanges 58 are spaced so that they are closely received within the vertically extending recess 62 of element 34. This is best seen in FIG. 3. Recess 62 further includes a vertically extending groove 64 which cooperates with the groove 60 of element 32 to define a valve element receiving slideway 66. The slideway 66 is sized so as to closely but freely receive the generally rectangular slide valve element 70. Valve element 70 will subsequently be described in detail. For the present purposes, however, it is sufficient to note that element 70 is vertically reciprocable in the slideway 66 so as to control the flow of fluid between the passages 44, 46 and 52, 54.

Figure 6:
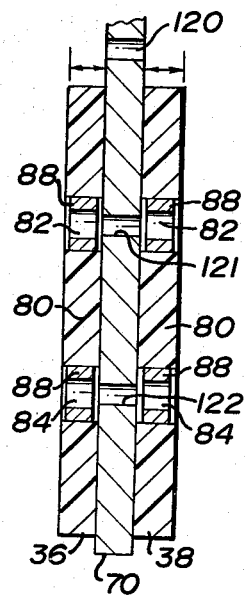

A fluid seal about the valve element 70 and the ports 44, 46 and 52, 54 is assured by resilient insert members 36, 38. The details of elements 36, 38 can best be seen with reference to FIGS. 5 and 6. Although the insert members 36, 38 could vary, they are shown as having identical construction and comprising a resilient elongated body 80 formed from any suitable material such as polytetrafluoroethylene or the like. Extending through each insert are openings 82, 84 which are spaced apart a distance corresponding to the vertical spacing between the pairs of openings 44, 46 and 52, 54. Each of the openings 82, 84 has positioned therein a rigid metallic ring member 88. The ring members 88 prevent cold flow or extrusion of the resilient packing material into the openings 82, 84. The thickness of the ring members is only slightly less than the thickness t of the inserts. This permits compression of the inserts without causing metal-to-metal contact between the rings and the slide valve 70.

As best seen in FIGS. 3 and 5, the recesses or grooves 60 and 64 each include a respective recess 90, 92 sized so as to closely receive the associated insert. The depth of the recesses 90, 92 is slightly less than the thickness t of the inserts. Thus, as can be appreciated, when the inserts are positioned in the recesses 90, 92, their exposed outer faces engage the opposite sides of the valve element 70. With the two sections 32, 34 clamped toward one another, a tight fluid seal is achieved between the inserts and the valve element 70. Additionally, a fluid seal is achieved between the bottom of each of the recesses 90, 92.

One aspect of the subject invention which is comparatively important resides in the manner by which the compressive loading or clamping of the two sections 32 and 34 is accomplished. As can be appreciated, the force with which the inserts are clamped against the valve element is relatively critical. Additionally, during the life of the valve, wear of the inserts must be compensated for by adjusting the clamping force. In the subject embodiment, the means used for applying the required adjustable clamping force comprise a vertically movable wedge member 100 which has a generally U-shaped configuration best seen in FIG. 5. As shown, the wedge member 100 has a first, generally vertical face 102 which is arranged to engage the left wall (as viewed in FIG. 3) of the vertical opening 20 of central body section 14. The right-hand face 104 of the wedge member 100 is tapered at an angle corresponding to the angle of face 40a of element 32. It should be noted that the wedge member 100 is provided with an open, vertically extending groove or recess 106 which has a width $w_1$ so that it closely but freely receives the laterally extending rectangular portion 42 of element 32.

As can be appreciated, with the wedge and valving assembly 30 positioned within the vertically extending opening 20 of the body 14, vertical movement of the wedge member 100 will serve to control the clamping force between elements 32, 34 and, accordingly, the sealing pressure applied to the insert members 36, 38.

Many different types of mechanisms could be used for adjusting the vertical movement of the wedge member 100. In the subject embodiment, however, the wedge member 100 is adjusted from exteriorly of the valve by a socket head machine screw member 110 which is received in a countersunk opening 112 in the bottom wall 18 (see FIGS. 2 and 4). The socket head machine screw 110 extends vertically upward into a tapped opening 114 formed in the bottom of wedge member 100. Accordingly, by adjusting the screw 110, the position of the wedge member 100 can be shifted to vary the clamping force as required. This adjustment can be made without affecting the fluid flow through the valve or without requiring any disassembly of the valve.

Referring again to the valve element 70, it should be appreciated that the valve could be used for simple off-on operation. That is, the valve element 70 could be operated and arranged simply to permit or block flow, for example, from passage 44 to passage 52 or, alternately, could be used for controlling flow from passage 46 to passage 54. In the subject device, however, as discussed earlier, the valve element 70 is arranged to permit a small sample of the fluid flowing between passages 44 and 52 to be shifted or deposited within the line between passages 46 and 54. To explain, reference is made to FIGS. 2 and 6. As shown, valve element 70 includes three transversely extending orifices or ports 120, 121 and 122 spaced as shown.

The spacing between the adjacent ports 120, 121 and 122 is equal to the vertical spacing between the passageways 44 and 46. With the valve element in the raised or uppermost position shown in FIG. 2, fluid can flow freely between the pairs of passages 44, 52 and 46, 54. However, if the valve element 70 is reciprocated vertically downward, the orifice 121 shifts from alignment with passages 44, 52 into alignment with passages 46, 54. Thus, a small section of the fluid flowing between ports 44, 52 is transferred to flow taking place between ports 46 and 54. Flow can continue between ports 44 and 52 because orifice 120 is moved into alignment with ports 44 and 52. It should be appreciated that various arrangements of the orifices in the valve element 70 could be provided so as to permit shifting of fluid samples in either direction between the various ports of the valve.

Many different types of mechanisms could be used for reciprocating the valve element 70. In the subject embodiment, the mechanism used comprises a simple lever handle 130 (see FIG. 1) which has a first end 132 pivotally connected to a bracket 134 carried on the top 16. The valve element 70 is pivotally connected to the lever 130 by a pin 134. As can be seen, merely by pivoting the handle 130, the valve element 70 is shifted vertically in the manner desired.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A sampling valve comprising:
a housing including a receiving cavity therein defined by rigid side walls;
a pair of body sections mounted in opposed relationship in said housing cavity, said body sections defining generally opposite sides of an elongated valve chamber with each body section having at least first and second flow passages which intersect said valve chamber;
an elongated valve member slidably received in said valve chamber, said valve member having at least a first orifice and a second orifice formed therethrough, said first and second orifices being located such that when said valve member is in a first position said first orifice connects said first flow passages and said second orifice connects said second flow passages;
means for moving said valve member from said first position to a second position to move said second orifice from connecting relationship with said second flow passages into connecting relationship with said first flow passages whereby a sample of fluid flow through said second flow passages can be transferred to said first flow passages; and,
wedge means disposed in said cavity and positioned between and in engagement with one of said body sections and a rigid side wall of said housing for producing relative movement between said body sections to vary their force of engagement with said valve member.

2. The valve as defined in claim 1 wherein said adjustable wedge means includes a generally U-shaped wedge member mounted for movement in a direction parallel to said slide valve member.

3. The valve as defined in claim 2 wherein the body section engaged by said wedge means has a portion extending through said wedge member.

4. The valve as defined in claim 1 including resilient inserts carried in each body section in a receiving recess disposed about said flow passages and sealingly engaging said valve member.

5. The valve as defined in claim 4 wherein said inserts have openings corresponding to said flow passages with annular rigid rings positioned in said openings, the thickness of said rings being slightly less than the thickness of said inserts.

6. The valve as defined in claim 1 wherein adjusting means are provided for adjusting the position of said wedge member.

7. The valve as defined in claim 6 wherein said adjusting means comprise a screw member operable from the exterior of said housing.

8. The valve as defined in claim 6 including manually operable means for moving said valve member.

9. The valve as defined in claim 6 wherein said wedge means is mounted for movement parallel to said valve member.

* * * * *